D. F. HULL.

Assignee to the Hagerstown Agricultural Implement Manufacturing Company.

MACHINE FOR SOWING FERTILIZERS.

Reissued March 13, 1877.

No. 7,555.

Attest:
H. C. Penine
D. P. Lowe

Inventor:
David Franklin Hull.
By A. C. Bradley
Attorney.

UNITED STATES PATENT OFFICE.

DAVIT F. HULL, OF HAGERSTOWN, MARYLAND, ASSIGNOR TO THE HAGERSTOWN AGRICULTURAL IMPLEMENT MANUFACTURING COMPANY.

IMPROVEMENT IN MACHINES FOR SOWING FERTILIZERS.

Specification forming part of Letters Patent No. 184,010, dated November 7, 1876; reissue No. 7,555, dated March 13, 1877; application filed February 21, 1877.

*To all whom it may concern:*

Be it known that I, DAVIT FRANKLIN HULL, of Hagerstown, county of Washington, and State of Maryland, have invented certain new and useful Improvements in Machines for Sowing Fertilizers, of which the following is a specification:

This invention relates to machines for sowing fertilizers, which consist, generally, of a hopper provided with a series of outlet-openings in its bottom, and stirrers or feeders, which pass the fertilizers into such outlet-openings, such machines being ordinarily attached to grain-drills and grain and fertilizer sown together by the combined machines.

My invention relates more particularly to forming the feed-orifices at an angle oblique to the motion of the stirring or feeding mechanism, so that, owing to the shearing action of the oblique edges of the orifices, the same are not liable to become clogged; also, to a horizontally-reciprocating bar, located at or near the bottom of the hopper, provided with one or more sets of feeding-fingers, of any desired number each, the number of sets corresponding with the number of outlet-openings, and each set adapted to use in connection with an outlet; also, to the peculiar adjustable feed-slides, forming the oblique openings, and to other details hereinafter fully described and claimed.

Figure 1:
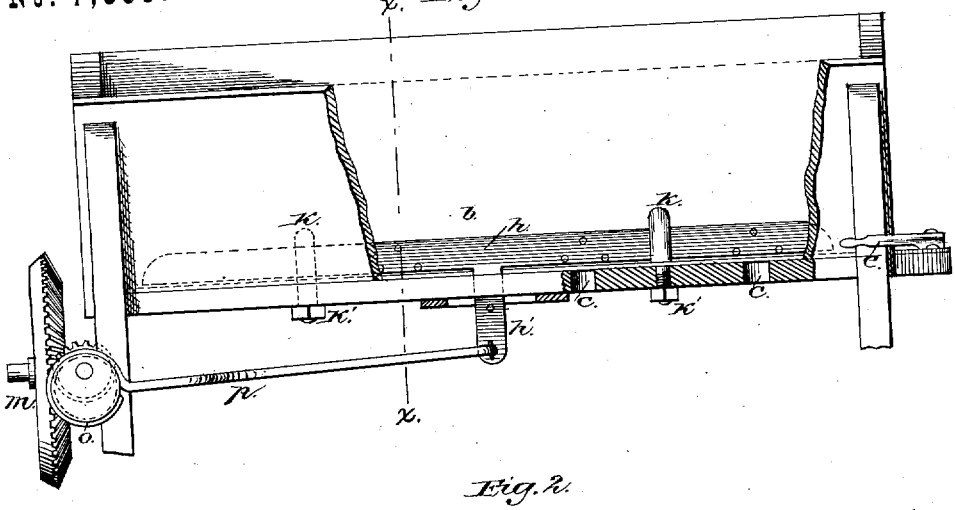
Figure 2:
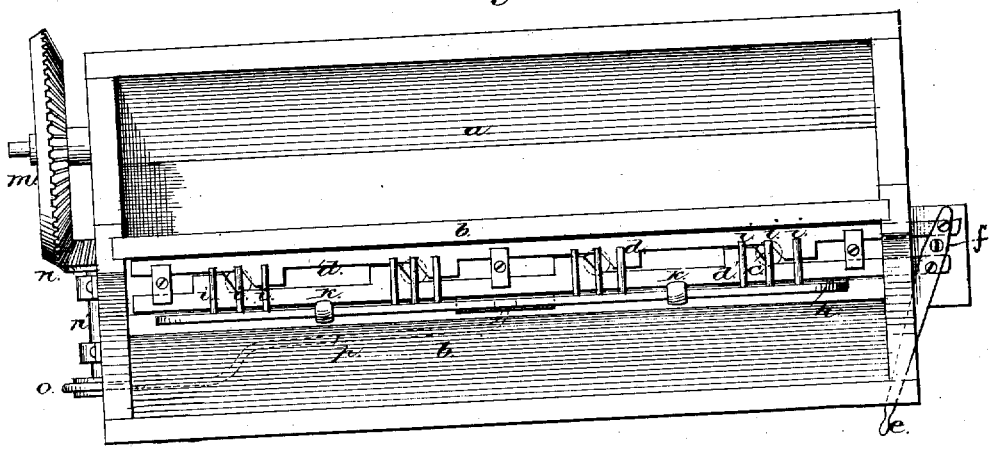
Figure 3:
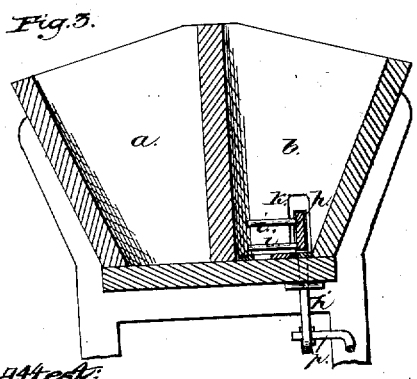
Figure 4:
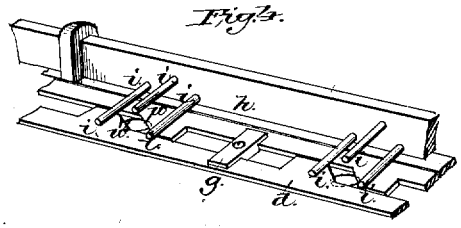

In the drawings, Figure 1 is a side elevation of a hopper containing my invention, a portion of the side being broken away to expose the working parts. Fig. 2 is a top or plan view of the same. Fig. 3 is a vertical section through the line *x x* of Fig. 1. Fig. 4 is an enlarged partial view of the feed-bar and slides.

In the drawings, *b* is the fertilizer-hopper, and *a* is the grain-hopper. In the bottom of the fertilizer-hopper are a series of outlet-openings, *c*, which communicate with the outlet-tubes, which tubes discharge both grain and fertilizer into the soil. Immediately over the outlet-openings are arranged two adjustable feed-slides, *d d'*, which are held in place by guides *g*, and project through an opening in one end of the hopper, where they are connected with, and operated by, a lever, *e*, pivoted to the frame of the machine at *f*. These feed-slides are so constructed, as shown in the drawings, that their adjustment will close the openings in the bottom of the hopper, or will form outlets of any desired size, and thereby regulate the discharge of the fertilizer. Both slides being operated by the centrally-pivoted lever *e*, the openings formed by their adjustment will always have the same fixed central point. These openings are at an oblique angle to the feeding-fingers, and the opening and closing edges *w w* are beveled off on their under side. Lengthwise of the hopper, resting upon its bottom, and in a line parallel to that of the feed-openings, is arranged the reciprocating bar *h*. This bar is kept in position by guides or keepers K, which pass through the bottom of the hopper, and are secured by nuts K', which serve to tighten the keepers whenever the bar wears loose therein. It is furnished with several sets of fingers, *i*, corresponding to the number of outlets, each set composed of any desired number of fingers, (three being preferred,) and arranged to operate over and in connection with one outlet. These fingers project at right angles from the bar, and two of each set work close to the bottom of the hopper and upon the feed-slides, while the third is elevated above and about midway between them. In the reciprocation of the bar neither of the lower fingers passes entirely across the outlet, but merely to the center and back. The back movement of the finger against the oblique-beveled edge of the feed-opening has a shearing effect, and clears the opening of any obstruction that may have lodged there during the forward movement of the finger, and thus permits the downward passage of the fertilizer. The upper finger, working a short distance above and between the lower fingers, renders very material aid in the regularity of the feed.

An additional advantage gained by the peculiar oblique angle of the slide-openings is, that the fingers in passing over the opening do not obstruct or close so much of it as would be the case were the openings in the same angle as that of the fingers. An arm, *h'*, attached to the bar *h*, passes through a slot in the bottom of the hopper, and is connected with a pitman-rod, *p*, which receives motion from an eccentric, *o*, upon shaft *n'*. This eccentric and shaft receive motion from the wheels of the carriage of the drill, communicated through gear-wheel *m* and pinion *n*.

Operation: A drill provided with this attachment for sowing fertilizers having been put in motion, the bar *h* will be caused to reciprocate, thus passing the various sets of feeding-fingers back and forth over the slide-outlets, such outlets having been adjusted to the desired size by means of lever *e*. The fertilizer in the hopper will gravitate to the outlets, and will be cut off by the fingers and pushed into the outlets, through which it will descend into the outlet-tubes, and thence be distributed upon the soil. The outlets never being being entirely closed by the passage of the fingers over them, the fertilizer will be continuously fed, and any obstructing lump, which otherwise might fill up the opening, will be sheared off by the action of the fingers against the knife-edges *w w* of the opening.

It is apparent that instead of a long reciprocating bar, provided with a number of sets of feeding-fingers, a series of reciprocating blocks may be used, each block carrying fingers adapted to feed through one or more outlets.

I claim as my invention—

1. In a fertilizer-sower, a hopper having one or more feed-orifices formed at an angle oblique to the line of motion of the stirrers, substantially as and for the purposes set forth.

2. Two adjustable feed-slides, arranged in the bottom of the hopper, and adapted to form a feed-orifice at an angle oblique to the angle of the feeding-fingers, for the purpose specified.

3. The combination of a horizontally-reciprocating bar, provided with feeding-fingers, with oblique feed-orifices, substantially as described.

DAVIT F. HULL.

Witnesses:
M. ISEMINGER,
JNO. M. KNODLE.